United States Patent [19]

Appelbaum et al.

[11] Patent Number: 5,249,206
[45] Date of Patent: Sep. 28, 1993

[54] FAULT-TOLERANT CLOCK FOR MULTICOMPUTER COMPLEX

[75] Inventors: Lawrence H. Appelbaum, St. Louis, Mo.; Thao Van Dang, Lake Katrine; William A. Moorman, Woodstock, both of N.Y.; Thomas B. Smith, III, Wilton, Conn.

[73] Assignee: International Business Machines Corporation, Armonk, N.Y.

[21] Appl. No.: 392,812

[22] Filed: Aug. 11, 1989

[51] Int. Cl.⁵ .............................................. H04L 7/00
[52] U.S. Cl. ................................... 375/107; 375/109; 375/120
[58] Field of Search ............... 375/109, 107, 118, 120; 370/100.1, 103, 104.1, 105; 340/825.2, 825.14

[56] References Cited

U.S. PATENT DOCUMENTS

| | | | |
|---|---|---|---|
| 3,128,465 | 4/1964 | Brilliant | 375/109 X |
| 3,588,703 | 6/1971 | Sorkin et al. | 375/109 |
| 4,140,972 | 2/1979 | Enriquez et al. | 375/109 X |
| 4,893,318 | 1/1990 | Potash et al. | 375/109 |

FOREIGN PATENT DOCUMENTS 098653 1/1984 Fed. Rep. of Germany.

OTHER PUBLICATIONS

Shin et al., "Transmission Delays in Hardware Clk synchronization" IEEE Transactions on Computers, vol. 37 No. 11, Nov. 1988 pp. 1465-1467.
Lindsey et al., "Network synchronization by means of Returnable Timing system", IEEE Transactions on Comm. vol. COM 26 No. 6 Jun. 1978 pp. 892-483.
Willard, "Analysis of a system of mutually synchronized Oscillators" IEE Transactions on Comm. Technology vol. COM-18 No. 5 Oct. 1970 pp. 467-483.
Shin, et al., "Clock synchronization of a large Multiprocessor System in the presence of Malicious Faults", IEEE Transaction on Computers C-36, No. 1 Jan. 1987, pp. 2-12.
Lamport et al., "Byzantine Clock synchronization", operating systems Review vol. 20 No. 3 Jul. 1986 pp. 10-16.
Krishna et al., "Synchronization and Fault masking in Redundant Real time systems", The 14th International Conference on Fault-Tolerant Computing Jun. 1984, pp. 152-157.
Thambidurai et al., "Clock synchronization in MAFT", The 19th International Symposium on Fault-Tolerant Computing, Jun. 1989 pp. 142-149.
"IBM System/370, Principles of operation", International Business Machines Corp., Jul. 1987, pp. 423-429.

Primary Examiner—Curtis Kuntz
Assistant Examiner—T. Bocure
Attorney, Agent, or Firm—Floyd A. Gonzalez; William A. Kinnaman

[57] ABSTRACT

A quad oscillator fault-tolerant clock system for a computer complex comprises two clock sources at each of two computer locations, which are coupled by two duplex links. Each clock source supplies its own clock signal to the other clock source at the same location as well as to the clock sources at the other location over one of the duplex links coupling the two locations. Each clock source continually measures the phase difference between its clock signal and each of the other three clock signals. Periodically, the propagation delay for each link is calculated by taking the average of the phase differences measured by the clock sources driving the two ends of that link. These calculated propagation delays are supplied to each individual clock source, which corrects the phase differences measured by it for the propagation delays. Each clock source uses the median of the corrected phase differences to obtain a correction signal to control its own oscillator frequency so as to obtain phase lock with the other clock signals.

8 Claims, 6 Drawing Sheets

FAULT-TOLERANT CLOCK FOR MULTICOMPUTER COMPLEX

BACKGROUND OF THE INVENTION

1. Field of the Invention

This invention relates to a fault-tolerant clock for use in a multicomputer complex, especially one in which the individual computers are separated by distances that are comparable to the clock wavelength.

2. Description of the Related Art

Multicomputer complexes having computers that are widely separated (e.g., by distances of up to several kilometers) are relatively common in the art. The signal propagation delay between individual computers typically exceeds the period of the high-frequency time-of-day (TOD) clocks which are used by the computers to measure time intervals and to time-stamp events. TOD clocks for high-performance computers are typically driven at a frequency of several tens of megahertz. Accordingly, maintaining absolute synchronism between such high-frequency clocks is difficult, and often not attempted. It is nevertheless desirable, however, for such a multicomputer complex to have synchronized lower-frequency clock signals for such purposes as cross-system time-stamping and the like. Such clock signals may have frequencies on the order of several kilohertz.

What are particularly desirable are TOD clocks that accomplish both objectives simultaneously—that is, clocks that have a high resolution for internal time-stamping purposes (i.e., within a particular computer of the complex), but are also synchronized on a coarser scale with other clocks in the complex for cross-system time-stamping. This may be implemented by providing each computer with a slave TOD clock which is phase-locked to a system-wide clock which runs at a submultiple of the TOD clock frequency.

Synchronized clock signals of the type referred to above are typically implemented by providing one or more clock sources at each computer location and phase-locking each clock source to a consensus signal derived from the other clock sources. Systems containing $3f+1$ such mutually coupled clock sources are capable of tolerating f individual points of failure, and are disclosed in such references as Fletcher et al. U.S. Pat. No. 3,900,741, Smith et al. U.S. Pat. No. 4,239,982, and the copending application of applicant T. B. Smith, Ser. No. 262,416, filed Oct. 25, 1988, entitled "Synchronized Fault Tolerant Clocks for Multiprocessor Systems", owned by the assignee of this application.

Of particular interest are quad oscillator systems, consisting of four mutually coupled clock sources, which tolerate any single point of failure. Thus, the Smith application referred to above discloses a quad system in which two clock sources are associated with each of two physically separated clock sites. The clock sites are physically separated to reduce the likelihood that a common source of failure will affect both sites simultaneously. Each computer receives two synchronized TOD clock signals, one from a clock source at each site, so that it may continue to receive a TOD clock signal for such purposes as time stamping even if one of the clock sources or clock sites should fail.

As noted above, the cross-system TOD clock synchronization signals have a much lower frequency than the high-frequency clocks used to drive the high-resolution TOD clocks of the separate computers. However, synchronization of the redundant clock sources can still be a problem if improved synchronization accuracy is desired and the clock sites are widely separated, owing to variations in propagation delay between the two sites. For example, if the separation between the two clock sites is changed from 1 km to 3 km, as may happen if one of the clock sites is relocated, the propagation delay between the two sites is correspondingly changed from about 5 to about 15 microseconds, a difference of about 10 microseconds. This figure does not include such other contributions to variations in delay as might be introduced by the encoder-decoder logic used to transmit the clock signals between the two locations. Moreover, the propagation speed through such dielectric media as fiber optic cables may itself vary and be source of propagation delay variations, even if the distance between the two sites remains unchanged.

Because of such propagation delay uncertainties, clock sources at widely separated locations, even though in phase, may observe leading or lagging clock signals from other sources, owing to uncompensated delays, and may therefore speed up or slow down in a mistaken attempt to match the phase of either a single distant clock signal or a consensus signal derived in part from such signal or signals. As a result, the clock sources may exhibit a significant phase skew relative to one another, on the order of many microseconds, or may shift in frequency, possibly beyond the maximum system design limits, and as a result break lock altogether.

The copending application referred to above discloses the use of a static delay element to delay the local clock signal to compensate for the propagation delay of the distant clock signal. However, such a static delay compensation would have to be selected or adjusted for a particular installation and would have to be readjusted if, as is common, the link path between the two locations were changed. Even then, the static delay element would not readjust itself for such variations in propagation delay as may arise from temperature variations or the like. Further, this would not be a satisfactory expedient in a system where more than two clock sites are used, since the required delay may vary for each pair of sites.

SUMMARY OF THE INVENTION

A principal object of the present invention is to provide a fault-tolerant clock for a multicomputer complex which is capable of operating with widely separated host computers.

Another object of the present invention is to provide a fault-tolerant clock which is capable of such operation with more than two clock sources.

A further object of the present invention is to provide a fault-tolerant clock which adjusts to changes in the link propagation paths between computer locations.

In general, the present invention contemplates a fault-tolerant clock system for a computer complex comprising one or more clock sources at each of a plurality of locations, which are coupled by links. Each clock source supplies its own clock signal to each other clock source at the same location directly and to clock sources at distant locations over the links, and continually measures the phase difference between its own clock signal and each of the other clock signals. In accordance with the invention, the propagation delay for each link is determined by taking the average of the reciprocal phase differences measured by respective clock sources at the two ends driving that link. These computed propagation delays are supplied to each individual clock source, which corrects the phase differences measured by it for the propagation delays. Each clock source uses the corrected phase differences to obtain a correction signal to control its own oscillator frequency so as to obtain phase lock with the other clock signals.

In principle, the invention can operate with as few as two clock sources. Preferably, however, to provide improved redundancy the system is implemented as a a quad system comprising two clock sources at each of two computer locations, which are coupled by two duplex links. Preferably, the propagation delay is computed at regular intervals which are relatively long compared with the period of the clock signals being synchronized. Preferably, if more than two clock sources are used, the correction signal for each clock source oscillator is derived from the median of the corrected phase differences measured by that source.

By actually calculating the link delay, rather than merely basing the design upon an expected link delay, the present invention eliminates the need to select a delay compensation based upon the expected link delay, as well as eliminating the need to adjust the delay manually if the link parameters are changed. In addition, by computing each phase difference individually and then correcting that phase difference for propagation delay before obtaining a consensus control signal, the propagation delay for each clock signal from other sources can be individually accounted for.

DESCRIPTION OF THE PREFERRED EMBODIMENT

Figure 1:
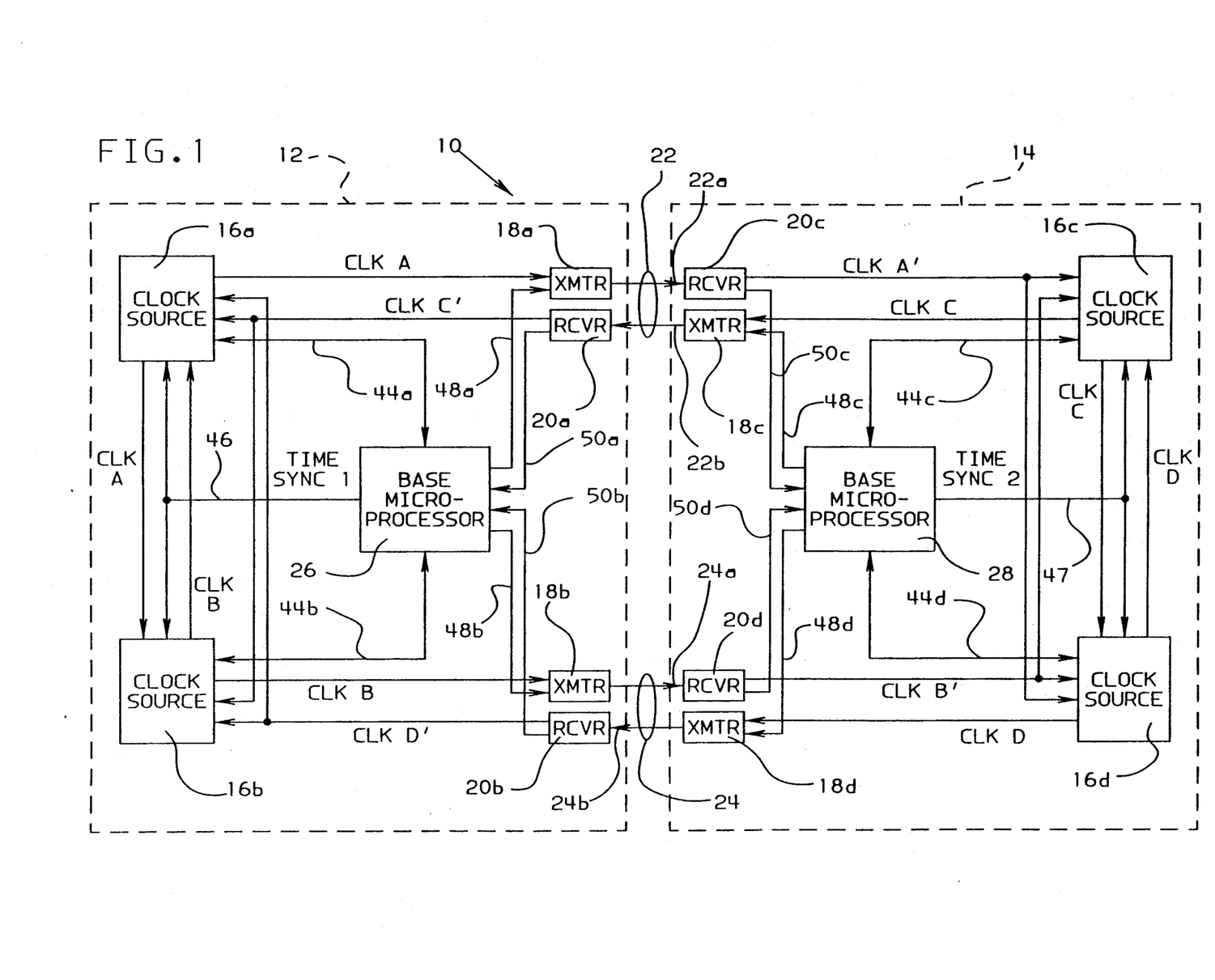
FIG. 1 is a schematic block diagram of a fault-tolerant clock system constructed in accordance with the present invention.
Figure 8:
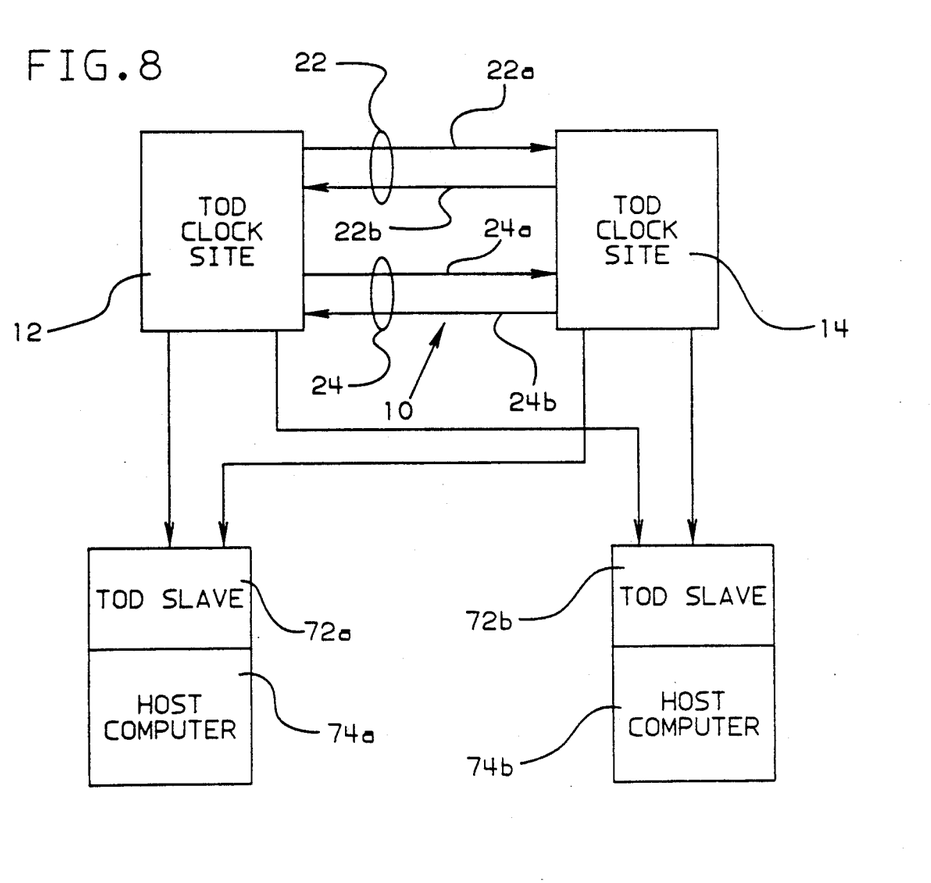
FIG. 8 is a schematic block diagram of a multicomputer complex utilizing the clock system shown in FIG. 1.

Referring now to FIG. 1, a fault-tolerant clock system constructed in accordance with the present invention, indicated generally by the reference numeral 10, includes a pair of subsystems or "boxes" 12 and 14, each of which may be physically associated with a host computer as shown in FIG. 8. Box 12 contains a pair of identical clock sources 16a and 16b, to be described in further detail below, while box 14 likewise contains a pair of clock sources 16c and 16d identical to clock sources 16a and 16b. Clock sources 16a-16d generate respective clock signals CLKA-CLKD, which have a nominal frequency of 7.8125 kHz ($2^{-7}$ MHz), which are phase-locked with one another in the manner to be described below.

Figure 5:
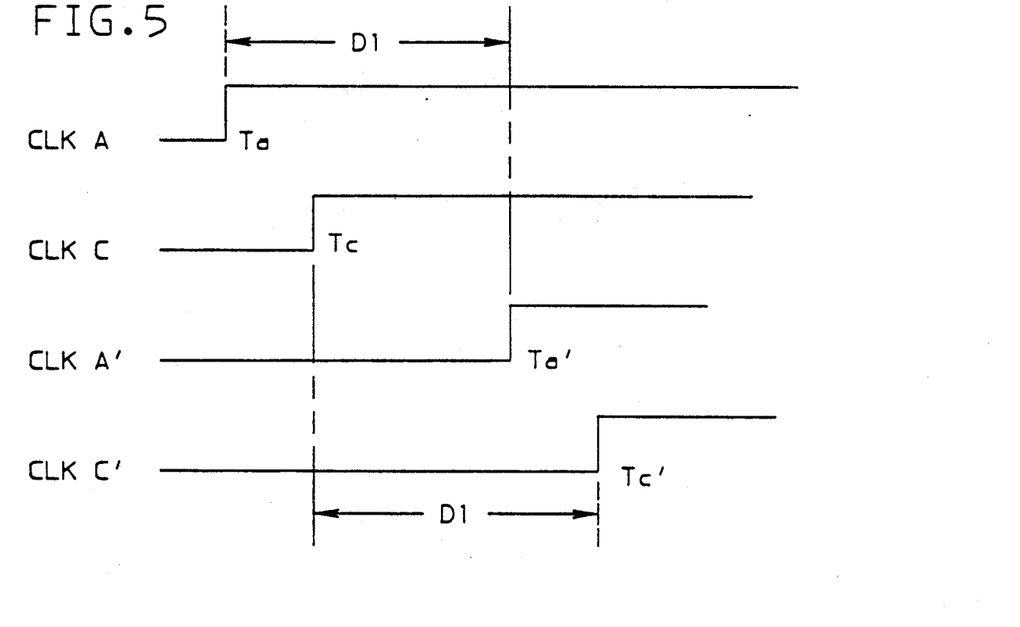
FIG. 5 is a timing diagram illustrating the principles underlying the link delay calculation.

Typically, boxes 12 and 14 may be separated from each other by a considerable distance, on the order of several kilometers. A pair of duplex fiber-optic links 22 and 24 are therefore used to transmit the clock signals CLKA-CLKD generated by clock sources 16a-16d between boxes 12 and 14. More particularly, clock source 16a supplies its clock signal CLKA to an encoder/transmitter 18a, which, in turn, transmits a suitably encoded optical signal over line 22a of link 22 to a receiver/decoder 20c located in box 14. A biphase encoding technique such as described in the copending application of applicant T. B. Smith may be used by transmitter 18a as well as the other transmitters to be described. Receiver 20c produces a regenerated clock signal CLKA'. Referring now to FIG. 5, the regenerated signal CLKA' is similar to the original clock signal CLKA supplied to transmitter 18a, except for a delay D1 introduced by elements 18a, 22a and 20c. Thus, as shown in FIG. 5, if a given level transition occurs in the original clock signal CLKA at time Ta, the same transition occurs in the regenerated signal CLKA' at time Ta', where Ta'=Ta+D1. As shown in FIG. 1, receiver 20c supplies the regenerated clock signal CLKA' to clock sources 16c and 16d in box 14. Clock source 16a also supplies the original clock signal CLKA to clock source 16b in its own box 12.

In a similar manner, clock source 16b supplies its clock signal CLKB to clock source 16a, as well as to box 14 by way of an encoder/transmitter 18b in box 12, line 24a of fiber-optic link 24 and receiver/decoder 20d in box 14. Receiver 20d supplies clock sources 16c and 16d with a regenerated clock signal CLKB', which is likewise delayed relative to the original clock signal CLKB, by a delay D2 characteristic of link 24. In a likewise similar manner, clock source 16c in box 14 supplies its own clock signal CLKC to clock source 16d as well as to box 12 by way of an encoder/transmitter 18c, line 22b of fiber-optic link 22 and receiver 20a in box 12. Receiver 20a supplies clock sources 16a and 16b with a regenerated clock signal CLKC' which, as shown in FIG. 5, is delayed relative to the original clock signal CLKC by the delay D1 characteristic of upper link 22. More specifically, as shown in FIG. 5, a given transition occurring in the original clock signal CLKC at time Tc will give rise to a corresponding transition in regenerated signal CLKC' occurring at time Tc', where Tc'=Tc+D1. Finally, clock source 16d supplies its clock signal CLKD to clock source 16c directly and to box 12 by way of encoder/transmitter 18d, line 24b of fiber-optic link 24 and receiver/decoder 20b in box 12. Receiver 20b supplies clock sources 16a and 16b with a regenerated clock signal CLKD' which is delayed relative to the original clock signal CLKD by the delay D2 characteristic of lower link 24.

The distance between the two clock sites 12 and 14 should be relatively small compared with the wavelength of the clock signals CLKA-CLKD. Preferably, the propagation delay between the two sites should be no more than one-fourth of a clock cycle.

Figure 2:
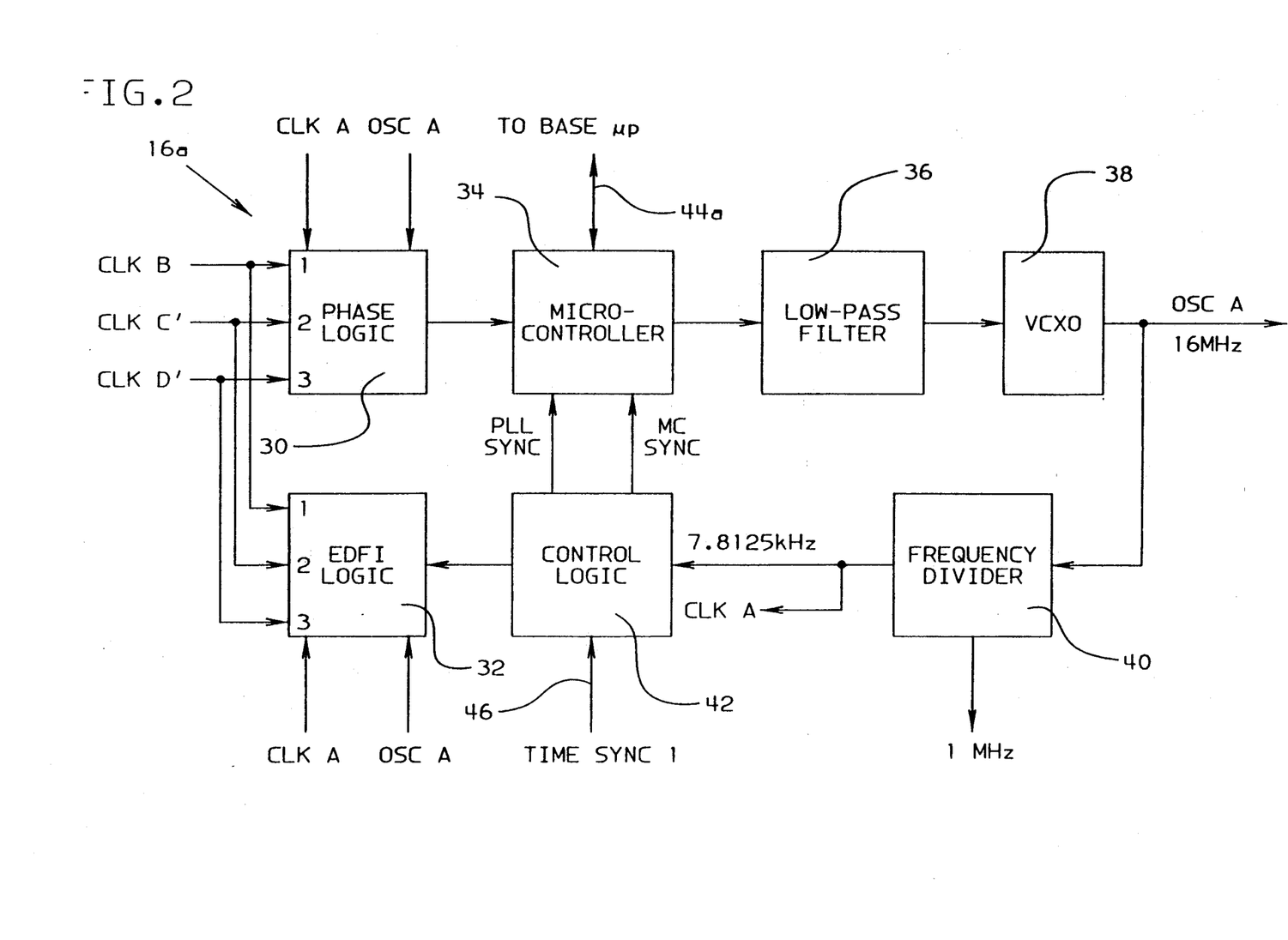
FIG. 2 is a schematic block diagram of one of the clock sources of the system shown in FIG. 1.

In addition to the clock sources, transmitters and receivers, boxes 12 and 14 also contain respective base microprocessors 26 and 28, which run on corresponding versions of microcode and which handle the link delay calculations, steering calculations and certain other functions in a manner to be described. Base microprocessor 26 communicates with clock sources 16a and 16b over respective bidirectional buses 44a and 44b and, in addition, supplies the two clock sources with a common TIME SYNC 1 interrogating signal on line 46. The interrogating signal requests that the clock sources provide their respective measured phase difference. In a similar manner, base microprocessor 28 in box 14 communicates with respective clock sources 16c and 16d by way of respective bidirectional buses 44c and 44d and supplies both clock sources with a common TIME SYNC 2 interrogating signal on line 47. Microprocessors 26 and 28 also communicate with each other through links 22 and 24 by way of serial lines 48a-48d and 50a-50d. Thus, microprocessor 26 supplies transmitters 18a and 18b with respective serial output signals over lines 48a and 48b, while, microprocessor 28 similarly supplies transmitters 18c and 18d with serial output signals over lines 48c and 48d. Microprocessor 26 also receives respective serial input lines 50a and 50b from receivers 20a and 20b while, similarly, microprocessor 28 receives respective serial input lines 50c and 50d from receivers 20c and 20d. As noted above, clock sources 16a-16d are identical to one another in their internal construction, and differ only in that they receive different sets of input signals. FIG. 2 shows the internal construction of one such clock source, clock source 16a. Clock source 16a receives a first clock input comprising the clock signal CLKB generated directly by clock source 16b, as well as second and third clock inputs comprising the regenerated (and therefore delayed) clock signals CLKC' and CLKD' originating from respective clock sources 16c and 16d in the other box 14. In the circuit shown in FIG. 2, a voltage-controlled crystal oscillator (VCXO) 38 provides an output signal OSCA having a nominal frequency F1, which may, for example, be 16 MHz. The signal OSCA from VCXO 38 supplies a clock input to a frequency divider 40 consisting of an n-bit counter. The most significant bit output of the counter constituting divider 40 is used to provide the clock signal CLKA, which has a frequency $$F2 = F\frac{1}{2}^n$$

where n is the number of bits in the counter. Typically, frequency divider 40 may comprise an 11-bit counter so that F2 is 7.8125 kHz if F1 is 16 MHz. Frequency divider 40 may also provide various outputs of intermediate frequency such as the 1 MHz output shown in FIG. 2. Frequency divider 40 supplies the CLKA signal to control logic 42, which is also responsive to the TIME SYNC 1 signal supplied on line 46 by base microprocessor 26. Control logic 42 supplies PLL SYNC and MC SYNC control signals to a microcontroller 34, which runs on its own microcode (identical for each clock source 16a-16d) and is coupled to the bus 44a from base microprocessor 26.

Microcontroller 34 additionally receives input lines (shown as one line in FIG. 2) from phase logic 30. Phase logic 30 measures the phase difference between the locally generated clock signal CLKA and each of the other three locally available clock signals, namely, clock signal CLKB from clock source 16b and regenerated clock signals CLKC' and CLKD' received over respective links 22 and 24. Phase logic 30 transmits the computed phase differences to microcontroller 34, which compensates the phase differences for the link delays D1 and D2. as described further below. If all three incoming clock signals are valid, microcontroller 34 selects the median of these corrected phase differences and uses the selected phase difference to control an internal pulse-width modulator (PWM), which supplies an output to a low-pass filter 36. Low-pass filter 36 converts the pulse-width-encoded signal to the actual control voltage for the VCXO 38. Filter 36 consists of a TTL-to-CMOS buffer, which converts the TTL output of the PWM to a regulated signal which varies between zero and the full voltage level of the power supply. This regulated signal is sent through a single-pole passive RC filter (not separately shown), which converts the voltage signal to a smooth waveform for the control voltage input to VCXO 38. VCXO 38 modulates its output frequency around the nominal frequency in proportion to the input voltage from low-pass filter 36.

Figure 3:
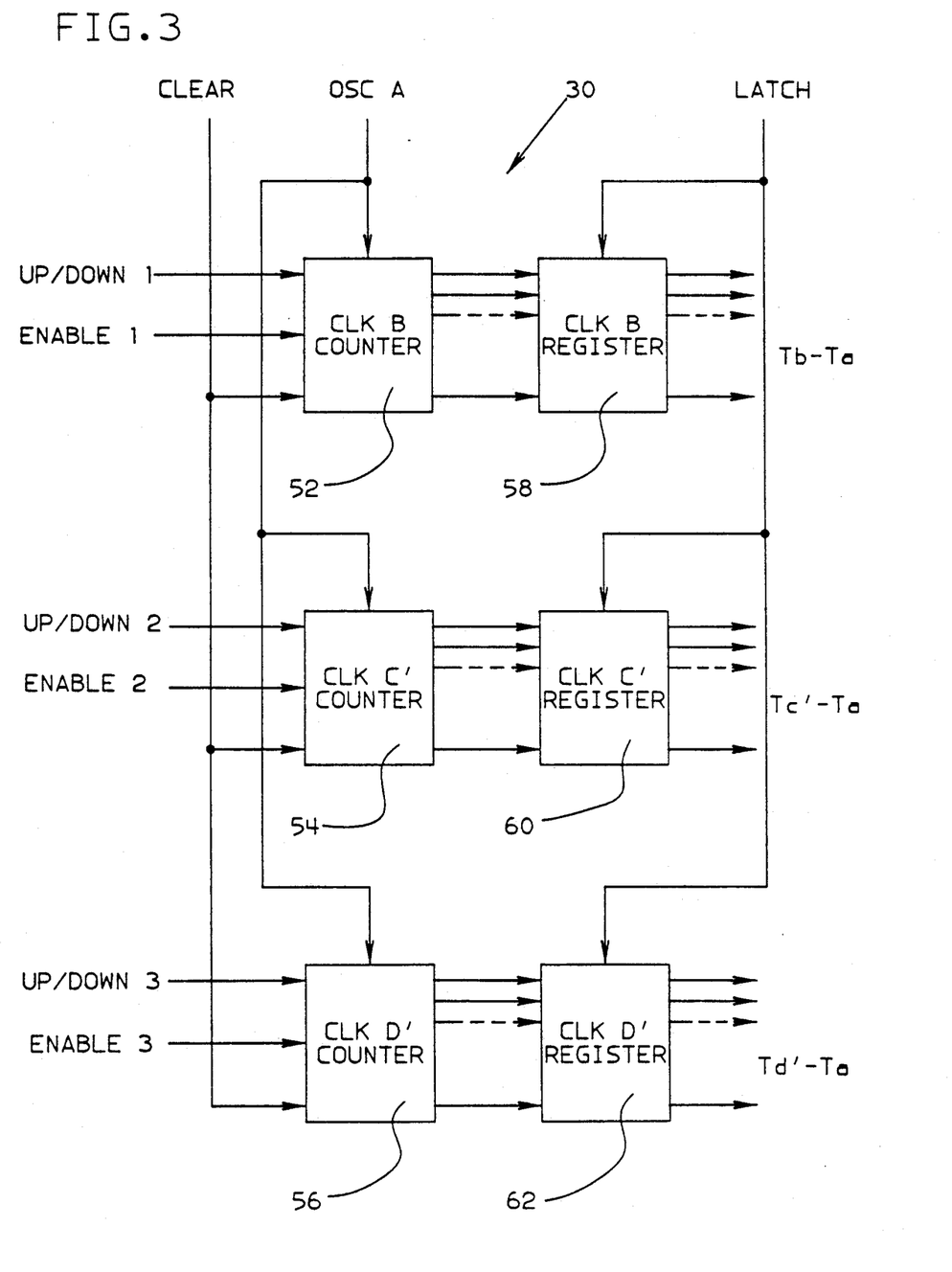
FIG. 3 is a schematic block diagram of a portion of the phase logic of the clock source shown in FIG. 1.
Figure 4:
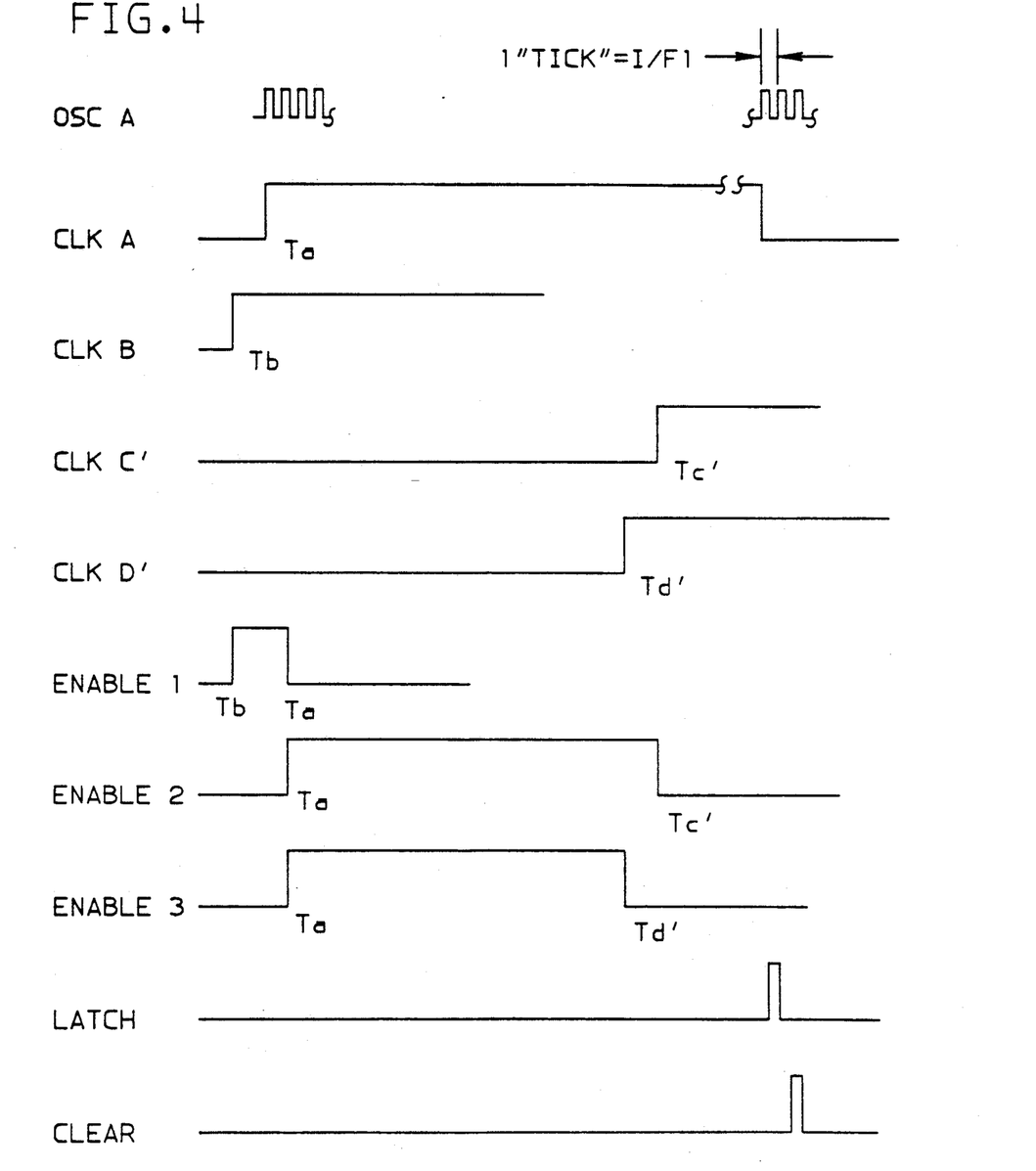
FIG. 4 is a timing diagram illustrating the operation of the phase logic shown in FIGS. 2 and 3.

Referring to FIG. 3, phase logic 30 contains respective 11-bit twos-complement phase counters 52, 54 and 56 corresponding to clock signals CLKB, CLKC' and CLKD'. Counters 52, 54 and 56 drive respective registers 58, 60 and 62. Each of counters 52-56 receives a clock signal from the local oscillator line OSCA and a clearing signal from a CLEAR line. Respective enabling signals ENABLE 1, ENABLE 2 and ENABLE 3 enable counters 52-56 to count in a direction determined by respective signals UP/DOWN 1, UP/DOWN 2 and UP/DOWN 3. Referring to FIG. 4, following a negative level transition of the signal CLKA, counters 52-56 are initially reset to zero. Each counter starts counting upon the appearance of a positive edge, either that of the local clock signal CLKA or that of the input clock signal CLKB, CLKC' or CLKD' with which that counter is associated, whichever occurs first. Each counter likewise stops counting upon the occurrence of the later positive edge of the two clock signals that it is comparing.

In the particular example shown in FIG. 4, clock signal CLKA lags clock signal CLKB slightly, but leads signals CLKC' and CLKD'. Accordingly, counter 52 is enabled beginning with the positive transition of the CLKB signal, at time Tb, and ending on the subsequent positive transition of the CLKA signal, at time Ta. Counter 54, on the other hand, is enabled beginning on the positive transition of the CLKA signal, at time Ta, and ending with the positive transition of the CLKC' signal, at time Tc'. Similarly, counter 56 is enabled beginning with the positive transition of the CLKA signal, at time Ta, and ending with the positive transition of the CLKD' signal at Td'. Counter 52 counts downwardly from zero, since the local clock signal CLKA lags the clock signal CLKB with which it is being compared, while counters 54 and 56 count upwardly since it is the local clock signal CLKA that leads in these cases.

Upon the next negative transition of the local clock signal CLKA, each counter 52-56 will have stored a count, in twos-complement form, varying between −1023 cycles of the OSCA signal, or "ticks", and +1023 ticks. One tick thereafter, registers 58-62 receive a LATCH signal, latching the contents of counters 52-56 into registers 58-62, respectively, for later reading by microcontroller 34. Counter 52-56 then receive a CLEAR signal, clearing their contents in preparation for another cycle of phase measurements in the manner described above. At any particular time, therefore, as a result of this process, register 58 provides an 11-bit output indicating the measured phase difference, in "ticks"(Tb−Ta), between the clock signal CLKB and the local clock signal CLKA. Similarly, register 60 provides an 11-bit output indicating the measured phase difference Tc'−Ta between the regenerated clock signal CLKC' and the local clock CLKA, while register 62 generates an 11-bit output indicating the measured phase difference Td'−Ta between the regenerated clock signal CLKD' and the local clock CLKA.

Referring again to FIG. 2, error detection and fault isolation (EDFI) logic 32, also responsive to clock signals CLKB, CLKC' and CLKD', detects whether any of these incoming clock signals have failed, namely, by determining whether the interval between successive level transitions falls within a predetermined allowable range or whether the input levels are stuck at indeterminate logic levels. If a failure is detected, EDFI logic 32 supplies a suitable signal to phase logic 30 to invert the most significant bit of the phase difference for that incoming clock signal, so as to put it outside the allowable range of between −1023 ticks and +1023 ticks.

Each microcontroller 34 determines that its clock source 16a−16d is locked to an input clock signal when the phase of that signal, corrected for any propagation delay, is within three ticks of its own reference signal CLKA−CLKD. On each cycle of its own clock signal CLKA−CLKD, each clock source 16a−16d transmits to the associated base microprocessor 26 or 28 the phase-locked and phase-valid status of each of the three input clock signals to that source.

Figure 7:
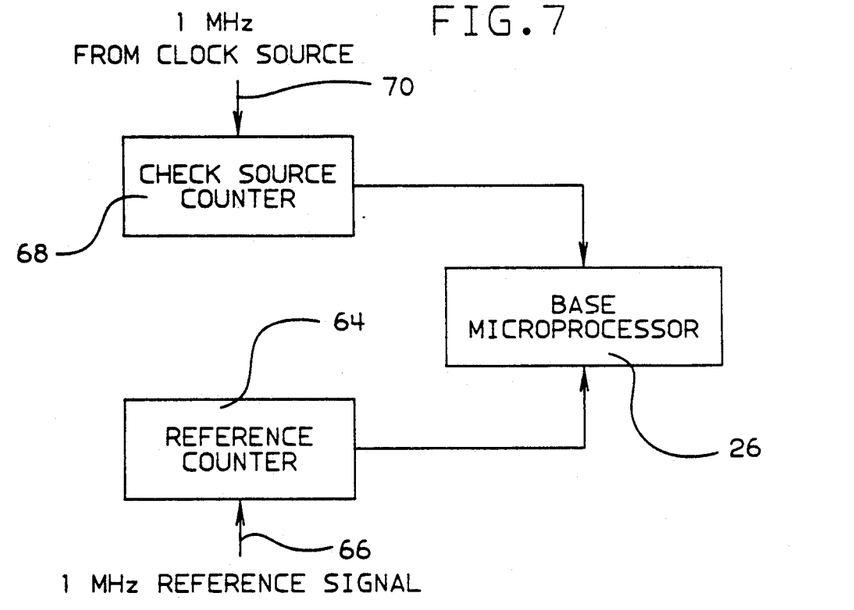
FIG. 7 is a schematic block diagram of the circuit used to generate the steering signal for the system shown in FIG. 1.

When the clock sources 16a−16d lock, the system 10 will operate at a consensus frequency that directly depends on such factors as power supply voltage, oscillator tolerance, gain and temperature. The accuracy of the quad system clock in keeping absolute time will be enhanced by steering it to a more precise external reference source. To steer the system 10, the 1 MHz clock of any one of the clock sources (e.g. 16b) is compared with an external reference. Thus, referring to FIG. 7, the 1 MHz output of clock source 16b is applied via line 70 to the clock input of a counter 68. Similarly, a 1 MHz reference signal is applied via line 66 to the clock input of a reference counter 64. Counters 64 and 68 supply their outputs to base microprocessor 26, which generates a "time delta" corresponding to the difference between the two counter outputs. Base microprocessor 26 converts this time delta to a "frequency delta" correction signal. Conveniently, the frequency delta may be a fixed negative value if the time delta is positive and vice versa. This frequency delta is added to the output of the transfer function of each microcontroller 34, causing the frequencies of the clock sources 16a−16d to steer in unison while still maintaining the operation of the interacting phase-locked loop.

Figure 6:
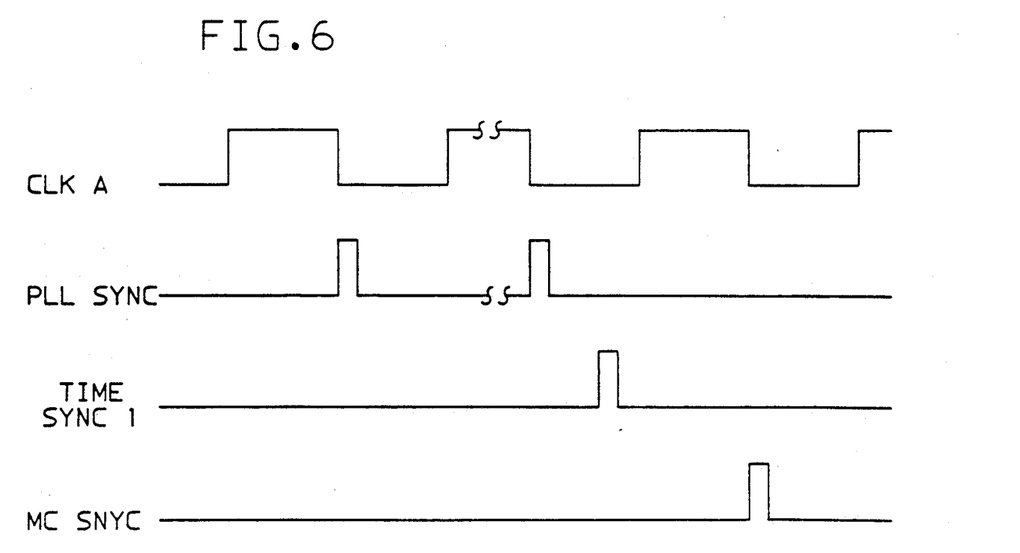
FIG. 6 is a timing diagram illustrating the timing of the various control signals received by or generated by the control logic of the clock source shown in FIG. 2.

On each negative level transition of the local clock signal CLKA, and in the absence of a TIME SYNC 1 signal on line 46, control logic 42 supplies microcontroller 44 with a PLL SYNC pulse as shown in FIG. 6. On the other hand, if the TIME SYNC 1 signal is or has just been active on line 46 from base microprocessor 26, logic 42 instead generates an MC SYNC pulse, as also shown in FIG. 6. Typically, the PLL SYNC signals may remain active for a period of 20 microseconds, as may the TIME SYNC 1 and TIME SYNC 2 signals from respective base microprocessors 26 and 28. In the embodiment shown, the synchronization signals TIME SYNC 1 and TIME SYNC 2 are separated by time intervals that are relatively long compared with the period of the clocks CLKA−CLKD. Thus, if the nominal period of the clock signals CLKA−CLKD is 128 microseconds, the period of the signals TIME SYNC 1 and TIME SYNC 2 may be $2^{20}$ microseconds, or one "Mus" as it is commonly known, a period of about 1.05 seconds.

The accuracy of the calculated link delays, and thus the delay compensation, has a direct effect on the skew between the phase-locked clock sources 16a−16d. Base microprocessors 26 and 28 should generate their respective synchronization signals TIME SYNC 1 and TIME SYNC 2 within one PLL period (128 microseconds) of each other to ensure the accuracy of the delay compensation to be described below. This may be accomplished in various ways, such as by having one of the TIME SYNC 1 and TIME SYNC 2 signals trigger the generation of the other signal or by generating both signals in response to synchronized clocks.

Microcontroller 34 responds to the PLL SYNC signal from control logic 42 to perform a series of operations to develop a phase-locked loop (PLL) control signal for low-pass filter 36. First, microcontroller 34 reads the most recent phase difference measurements stored in phase registers 58−62 of phase logic 30. Next, the microcontroller 34 corrects the phase difference measurements (Tc'−Ta) and (Td'−Ta) for the respective one-way delays D1 and D2, previously calculated for upper and lower links 22 and 24 in a manner to be described. More particularly, microcontroller 34 calculates true phase differences (Tc−Ta) and (Td−Ta), where $$(Tc-Ta)=(Tc'-Ta)-D1$$

and $$(Td-Ta)=(Td'-Ta)-D2.$$

If the uncompensated phase difference measurement was near the lower limit of the allowable range of between −1023 ticks and +1023 ticks, the effect of the compensation may be to put the compensated phase difference below the lower limit. If this occurs, a full cycle (2048 ticks) is added to the corrected measurement to restore it to the allowable range. Since the other delay measurement (Tb−Ta) is for the clock source 16b in the same box 12, there is no link delay and hence no need for compensation.

Microcontroller 34 then selects one of the true phase differences (Tb−Ta), (Tc−Ta) and (Td−Ta) to develop a control signal for oscillator 38. If all three phase measurements are currently valid, microcontroller 34 selects the median of these three phase measurements. If only two phase measurements are valid, then microcontroller 34 selects the greater (i.e., more positive) of these two phase differences. If only one phase difference measurement is valid, the microcontroller 34 selects that one valid phase measurement. If none of the phase measurements are valid, then microcontroller 34 simply supplies a correction signal that is zero plus any 37 steering" signal, as described below. This dynamic process of phase selection guarantees that the four clock sources will converge on a consensus frequency even if two of the four signal lines 22a−22b and 24a−24b between the two boxes 12 and 14 have failed.

Assuming that one or more of the phase difference measurements are valid, the microcontroller 34 applies a precalculated transfer function contained in its microcode to the selected phase measurement. Microcontroller then adds to the output of the transfer function the steering frequency delta to obtain a multibit value which it uses to control its internal PWM, which drives low-pass filter 36. In operation the transfer function forces all unlocked clock sources to a locked state, and when in the locked state, will compensate for system fluctuation to maintain the relative phases of all clock sources within defined limits. These calculations are repeated on each cycle of the local clock CLKA in response to the PLL SYNC signal from control logic 42. Low-pass filter 36 thus receives a correction signal that is updated approximately every 128 microseconds in the particular embodiment shown. Clock sources 16b-16d operate concurrently with clock source 16a in a similar manner except, of course, that each clock source uses its own oscillator signal to count "ticks" and receives a different set of input clock signals with which its own clock signal is compared.

FIG. 5 shows the relative timings of the original clock signals CLKA and CLKC generated by clock sources 16a and 16c, as well as the regenerated clocks CLKA' and CLKC' generated by respective receivers 20c and 20a coupled to link 22. Assuming, as is reasonable for a duplex link, that the propagation delay encountered on link 22 is the same in either direction, a given positive edge of the regenerated clock CLKA' will appear at time Ta', which is delayed relative to the corresponding transition of the original clock CLKA by the link delay D1. In a similar manner, a given positive edge of the regenerated clock CLKC' occurs at time Tc', which is delayed relative to the time Tc of the corresponding transition of the original clock CLKC by the same delay D1. This relationship may be expressed by the following two equations:

$$Ta' = Ta + D1$$

$$Tc' = Tc + D1$$

Solving this system of simultaneous equations for D1, one obtains:

$$D1 = (Ta' - Tc) + (Tc' - Ta)]/2$$

The actual link delay D1 is, of course, positive. If, however, Tc lags Ta by almost half a cycle, as may occur on startup, the propagation delay may cause Tc' to lag Ta by more than half a cycle. Phase logic 30 regards such a phase lag of over half a cycle as a phase lead, however, in effect decrementing the phase difference (Tc' − Ta) by a full cycle to bring it within the allowable range. Thus both (Tc' − Ta) and (Ta'Tc) as measured by phase logic 30 may be initially negative, and straightforward use of the above formula may yield a negative delay value. This may be corrected for in the link delay calculation by adding half a cycle (1024 ticks) to the calculated delay if it is negative.

By a similar process, one may calculate the delay D2 of the lower link 24 as a function of the observed phase differences (Tb' − Td) and (Td' − Tb):

$$D2 = (Tb' - Td) + (Td' - Tb)]/2.$$

A correction similar to the one noted above would be made if the delay calculated using this formula is negative.

Each base microprocessor 26 and 28 independently calculates the link delays D1 and D2 as a function of the apparent phase differences (Tc' − Ta), (Td' − Tb), (Ta' − Tc) and (Tb' − Td), using the above formulas. To facilitate these calculations by base microprocessors 26 and 28, upon receiving an MC SYNC signal generated by control logic 42 in response to a TIME SYNC 1 signal from base microprocessor 26, microcontroller 34 of clock source 16a transmits a signal representing the measured phase difference (Tc' − Ta) to base microprocessor 26 over bus 44a. In a similar manner, upon receiving the TIME SYNC 1 signal on line 46, clock source 16b transmits to base microprocessor 26 a signal representing the observed phase difference (Td' − Tb) over bus 44b. Likewise, in the other box 14 clock source 16c, upon receiving a TIME SYNC 2 signal over 28 line 47, transmits to base microprocessor over bus 44c a signal representing the observed phase difference (Ta' − Tc). Finally, in response to the same TIME SYNC 2 signal on line 47, clock source 16d transmits to base microprocessor 28 over bus 44d a signal representing the observed phase difference (Tb' − Td).

Base microprocessors 26 and 28 then exchange this phase difference information, preferably as shown, over the same links 22 and 24 used to transmit the clock signals CLKA-CLKD. Thus, base microprocessor 26, upon receiving the measurement (Tc' − Ta) from clock source 16a, transmits this measurement to microprocessor 28 by way of serial output line 48a, transmitter 18a, line 22a of link 22, receiver 20c and serial input line 50c. Similarly, upon receiving the observed phase difference (Td' − Tb) from clock source 16b, base microprocessor 26 transmits this data serially to base microprocessor 28 by way of serial output line 48b transmitter 18b, line 24a of link 24, receiver 20d and serial input line 50d. Conversely, upon receiving the observed phase difference (Ta' − Tc) from clock source 16c, base microprocessor 28 transmits this information serially to base microprocessor 26 by way of serial output line 48d, transmitter 18d, line 24b of link 24, receiver 20b and serial input line 50b. Finally, upon receiving the observed phase difference (Tb' − Td) from clock source 16d, base microprocessor 28 transmits this information to base microprocessor 26 by way of serial output line 48d, transmitter 18d, line 24b of link 24, receiver 20b, and receiver input line 50b.

Having thus obtained each of the necessary independent variables (Tc' − Ta), (Ta' − Tc), (Td' − Tb) and (Tb' − Td), microprocessors 26 and 28 each proceed independently to calculate the link delays D1 and D2 using the above formulas. Following the next TIME SYNC 1 signal generated by it, microprocessor 26 transmits the calculated delays D1 and D2 to clock sources 16a and 16b via respective buses 44a and 44b. Similarly, following the next TIME SYNC 2 signal generated by it, base microprocessor 28 transmits the calculated values D1 and D2, which should be the same as those calculated by microprocessor 26, to clock sources 16c and 16d by way of respective buses 44c and 44d. Each microcontroller 34 of clock source 16a−16d reads in these delay values, as well as the latest steering frequency delta, upon its next MC SYNC signal activation. As a result of this continuous iterative process, each of clock sources 16a-16d receives a pair of calculated link delay values D1 and D2, based upon the observed phase differences previously transmitted to the microprocessors 26 and 28 by the clock sources. This permits dynamic compensation for transmission delay, as distinguished from the static compensation of prior systems.

Referring now to FIG. 8, boxes 12 and 14 transmit respective low-frequency (7.8125 kHz) synchronization signals to TOD slave clocks 72 associated with the respective host processors 74 of the complex. The synchronization signal for each box 12 or 14 may be derived from one of the clock sources in the box, for example, clock signal CLKB from source 16b for box 12 and clock signal CLKD from source 16d for box 14. Each slave clock 72 contains a phase-lock loop (PLL) which locks on to a selected one of the clock signals supplied by boxes 12 and 14, as described in the copending application of applicant T. B. Smith, incorporated herein by reference. In a manner similar to that of the clock sources 16a–16d, the PLL of each slave clock 72 contains a high-frequency (e.g., 16 MHz) oscillator driving a frequency divider. The output of the frequency divider is compared in phase with that of the selected synchronization signal to derive a difference signal that controls the frequency of the oscillator. By virtue of this arrangement, each TOD slave clock 72 provides its associated host processor with a high-resolution clock for internal time-stamping purposes. At the same time, however, each slave clock 72 is synchronized with every other slave clock 72, on the coarser scale of the clock signals CLKB and CLKD, for cross-system time-stamping.

Suitable variations on the system described above will be apparent to those skilled in the art. Thus, instead of having a pair of clock sources, each site may have more than two clock sources, or only a single clock source, if desired. Further, more than two clock sites may be employed. Finally, although the clock sites are generally widely separated, this too is not a necessary condition. Thus, the term "location" as used herein implies no particular spatial separation, and the clock sources of the system may in fact be adjacent to one another. In such an instance the delay calculation and compensation may be performed primarily because of the uncertainty as to whether the clock sites are in fact close together.

While the invention has been particularly shown and described with reference to preferred embodiments thereof, it will be understood by those skilled in the art that various changes in form and details may be made therein without departing from the spirit and scope of the invention.

What is claimed is:

1. A method of generating synchronized clock signals from a first clock source and a second clock source comprising the steps of:
    generating a periodic first source clock signal at said first clock source and a periodic second source clock signal at said second clock source;
    transmitting said first source clock signal to said second clock source and said second source clock signal to said first clock source;
    measuring a first source phase difference between said first and second source clock signals at said first clock source in response to said second source clock signal received from said second clock source and a second source phase difference between said first and second source clock signals at said second clock source in response to said first source clock signal received from said first clock source;
    calculating a transmission delay between said first clock source and said second clock source as a function of said measured first source and second source phase differences;
    providing said calculated transmission delay to said first clock source and said second clock source as an external correction signal;
    adjusting said first source and second source phase differences in accordance with said external correction signal; and
    modifying first source and second source clock signal frequencies in accordance with said adjusted first source and second source phase differences, respectively.

2. Apparatus for generating synchronized clock signals comprising:
    a first clock source at a first location and a second clock source at a second location, each clock source comprising: means for generating a periodic local clock signal, means responsive to a periodic local clock signal received from the other of said first clock source and second clock source for measuring a phase difference between said local clock signal and said received clock signal, means for adjusting said phase difference in accordance with an external correction signal, and means for modifying frequency of said local clock signal in accordance with said adjusted phase difference;
    means for transmitting said periodic local clock signal generated by said first clock source to said second clock source and said periodic local clock signal generated by said second clock source to said first clock source; and
    means for calculating a transmission delay between said first source and said second source as a function of said measured phase differences at said first and second clock sources, and for providing said calculated transmission delay to said first source and said second source as said external correction signal.

3. Apparatus as in claim 2 comprising a plurality of clock sources at each of said first location and said second location, wherein each said measuring means measures a phase difference between said periodic local clock signal generated at a given clock source and said clock signal received from each other clock source at said first location and said second location , wherein said transmitting means transmits each said clock signal from each said clock source at said first location and said second location to each other said clock source at said first location and said second location, and wherein said calculating means calculates a transmission delay between each said clock source at said first location and said second location and each other clock source at said first location and said second location and provides said calculated transmission delay to each respective clock source.

4. Apparatus as in claim 2, wherein said calculating means transmits an interrogating signal to each clock source triggering each said clock source to transmit the phase difference measured at that clock source to said calculating means.

5. Apparatus as in claim 4, wherein said interrogating signal is transmitted to each said clock source substantially simultaneously.

6. Apparatus as in claim 4, wherein said interrogating signal is transmitted to each said clock source periodically.

7. Apparatus as in claim 4, wherein said means for transmitting said first and second source clock signals comprises a data link extending between said first and second clock sources, and wherein said interrogating signal is transmitted to each said clock source over said link.

8. A PLL clock source comprising:
   means for generating a periodic local clock signal;
   means for measuring a phase difference between said local clock signal and each of a plurality of other periodic clock signals;
   means for selecting one said measured phase difference;
   means responsive to said selected phase difference for modifying said local clock signal frequency;
   means for receiving an external correction signal;
   and means for adjusting at least one said measured phase difference in response to said external correction signal.

* * * * *